United States Patent
Lagadapati (10) Patent No.: US 12,130,807 B2
(45) Date of Patent: *Oct. 29, 2024

(54) INTERMEDIATE COMMUNICATION LAYER TO TRANSLATE A REQUEST BETWEEN A USER OF A DATABASE AND THE DATABASE

(71) Applicant: T-Mobile USA, Inc., Bellevue, WA (US)

(72) Inventor: Ravi Lagadapati, Bothell, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/348,116

(22) Filed: Jul. 6, 2023

(65) Prior Publication Data

US 2023/0350888 A1 Nov. 2, 2023

Related U.S. Application Data

(63) Continuation of application No. 17/382,229, filed on Jul. 21, 2021, now Pat. No. 11,741,093.

(51) Int. Cl.
*G06F 16/2452* (2019.01)
*G06F 16/22* (2019.01)
(Continued)

(52) U.S. Cl.
CPC ........ *G06F 16/2452* (2019.01); *G06F 16/221* (2019.01); *G06F 16/2282* (2019.01); *G06F 16/24553* (2019.01); *G06F 16/248* (2019.01)

(58) Field of Classification Search
CPC .......................... G06F 16/2452; G06F 16/221
(Continued)

(56) References Cited

U.S. PATENT DOCUMENTS

| 5,696,961 A | 12/1997 | Briscoe et al. |
| 5,734,887 A | 3/1998 | Kingberg et al. |

(Continued)

FOREIGN PATENT DOCUMENTS

| CN | 109885589 A | 6/2019 |
| CN | 109918394 A | 6/2019 |

(Continued)

*Primary Examiner* — Muluemebet Gurmu
(74) *Attorney, Agent, or Firm* — Perkins Coie LLP (57) ABSTRACT

The system receives a request associated with a database including a query and a type associated with the database. The request is expressed in a language not native to the database. The query includes a command in the language not native to the database. The type associated with the database can include an in-memory database, a NoSQL database, or a relational database. Based on the type associated with the database, the system can create a corresponding command native to the database by translating the query to the corresponding command native to the database. The system can connect to the database, execute the corresponding command native to the database, and receive an output of the corresponding command native to the database. The system can translate the output of the corresponding command native to the database into the language not native to the database and provide the translated output to the user.

20 Claims, 7 Drawing Sheets

(51) Int. Cl.
*G06F 16/2455* (2019.01)
*G06F 16/248* (2019.01)

(58) Field of Classification Search
USPC .......................................................... 707/769
See application file for complete search history.

(56) References Cited

U.S. PATENT DOCUMENTS

| | | | |
|---|---|---|---|
| 5,826,257 | A | 10/1998 | Snelling |
| 6,523,036 | B1 | 2/2003 | Hickman et al. |
| 6,606,627 | B1 | 8/2003 | Guthrie et al. |
| 6,801,841 | B2 | 10/2004 | Tabe |
| 6,810,259 | B1 | 10/2004 | Zhang |
| 6,898,597 | B1 | 5/2005 | Cook et al. |
| 7,058,632 | B1 | 6/2006 | Ramamurthi et al. |
| 7,206,853 | B2 | 4/2007 | Eytchison et al. |
| 7,231,396 | B2 | 6/2007 | Ayachitula et al. |
| 7,328,209 | B2 | 2/2008 | Das et al. |
| 7,383,262 | B2 | 6/2008 | Das et al. |
| 7,467,018 | B1 | 12/2008 | Callaghan |
| 7,499,909 | B2 | 3/2009 | Liu et al. |
| 7,577,681 | B1 | 8/2009 | Rozenman et al. |
| 7,650,338 | B2 | 1/2010 | Grossfeld et al. |
| 7,657,516 | B2 | 2/2010 | Zaman et al. |
| 7,797,304 | B2 | 9/2010 | Muralidhar et al. |
| 7,797,342 | B2 | 9/2010 | Banks et al. |
| 7,873,649 | B2 | 1/2011 | Krishnaprasad et al. |
| 7,991,783 | B2 | 8/2011 | Flynn et al. |
| 8,037,460 | B2 | 10/2011 | Lee et al. |
| 8,095,531 | B2 | 1/2012 | Weissman et al. |
| 8,108,367 | B2 | 1/2012 | Konik et al. |
| 8,112,383 | B2 | 2/2012 | Acheson et al. |
| 8,135,730 | B2 | 3/2012 | Lim et al. |
| 8,141,100 | B2 | 3/2012 | Ben-natan et al. |
| 8,316,045 | B1 | 11/2012 | Breau et al. |
| 8,346,788 | B1 * | 1/2013 | Kim ................. G06F 16/20 707/756 |
| 8,463,888 | B1 | 6/2013 | Boyer et al. |
| 8,495,056 | B2 | 7/2013 | Le et al. |
| 8,498,996 | B2 | 7/2013 | Whitcher et al. |
| 9,569,511 | B2 | 2/2017 | Morin |
| 9,613,094 | B2 | 4/2017 | Mindnich et al. |
| 9,674,261 | B2 | 6/2017 | Nathan et al. |
| 9,697,253 | B2 | 7/2017 | Chidambaran et al. |
| 9,710,531 | B2 | 7/2017 | Block et al. |
| 9,715,527 | B2 | 7/2017 | Mindnich et al. |
| 9,747,388 | B2 | 8/2017 | Micucci et al. |
| 9,798,752 | B1 | 10/2017 | Naffziger et al. |
| 9,842,137 | B2 | 12/2017 | Franz et al. |
| 9,886,477 | B2 | 2/2018 | Jahankhani |
| 9,886,484 | B2 | 2/2018 | Venkataramani et al. |
| 9,892,137 | B2 | 2/2018 | Olivieri et al. |
| 10,346,285 | B2 | 7/2019 | Baer et al. |
| 10,367,904 | B2 | 7/2019 | Dowlatkhah |
| 10,417,251 | B2 | 9/2019 | Willson et al. |
| 10,516,666 | B2 | 12/2019 | Yu |
| 10,540,679 | B2 | 1/2020 | Liu et al. |
| 10,560,457 | B2 | 2/2020 | Anderson et al. |
| 10,599,678 | B2 | 3/2020 | Kapoor et al. |
| 10,635,666 | B2 | 4/2020 | Rastogi et al. |
| 10,649,986 | B2 | 5/2020 | Wong et al. |
| 10,649,987 | B2 | 5/2020 | Wong et al. |
| 10,671,626 | B2 | 6/2020 | Dray et al. |
| 10,740,767 | B2 | 8/2020 | Withrow |
| 10,749,840 | B2 | 8/2020 | Augustyn |
| 10,776,349 | B2 | 9/2020 | Wong et al. |
| 10,803,062 | B2 | 10/2020 | Wong et al. |
| 10,817,524 | B2 | 10/2020 | Shah et al. |
| 10,824,617 | B2 | 11/2020 | Cseri et al. |
| 10,904,298 | B2 | 1/2021 | Sondhi et al. |
| 10,929,246 | B2 | 2/2021 | Iyengar et al. |
| 10,977,244 | B2 | 4/2021 | Grabs et al. |
| 2003/0126114 | A1 * | 7/2003 | Tedesco ............. G06F 16/2452 |
| 2003/0236859 | A1 | 12/2003 | Vaschillo et al. |
| 2004/0034521 | A1 | 2/2004 | Kawakura et al. |
| 2004/0059706 | A1 | 3/2004 | Abelite |
| 2004/0111728 | A1 | 6/2004 | Schwalm |
| 2004/0181513 | A1 | 9/2004 | Henderson et al. |
| 2005/0131649 | A1 | 6/2005 | Larsen et al. |
| 2005/0177358 | A1 | 8/2005 | Melomed et al. |
| 2005/0209903 | A1 | 9/2005 | Hunter et al. |
| 2006/0047780 | A1 | 3/2006 | Patnude |
| 2006/0173850 | A1 | 8/2006 | Auer et al. |
| 2006/0282447 | A1 | 12/2006 | Hollebeek |
| 2007/0027955 | A1 | 2/2007 | Voss et al. |
| 2007/0033157 | A1 | 2/2007 | Gray |
| 2007/0220004 | A1 | 9/2007 | Fifield et al. |
| 2007/0220155 | A1 | 9/2007 | Nalla et al. |
| 2008/0086501 | A1 | 4/2008 | Levine |
| 2008/0120309 | A1 | 5/2008 | Copeland |
| 2008/0265029 | A1 | 10/2008 | Graves |
| 2009/0150367 | A1 | 6/2009 | Melnik et al. |
| 2009/0222452 | A1 | 9/2009 | Bagg et al. |
| 2009/0313212 | A1 | 12/2009 | Aust |
| 2010/0023952 | A1 | 1/2010 | Sandoval et al. |
| 2010/0082656 | A1 | 4/2010 | Jing et al. |
| 2010/0287185 | A1 | 11/2010 | Cras et al. |
| 2011/0161375 | A1 | 6/2011 | Tedder et al. |
| 2011/0302220 | A1 | 12/2011 | Marcella et al. |
| 2012/0323947 | A1 | 12/2012 | Bice et al. |
| 2012/0330988 | A1 | 12/2012 | Christie et al. |
| 2013/0007523 | A1 | 1/2013 | Unger et al. |
| 2013/0145348 | A1 | 6/2013 | Agovic et al. |
| 2013/0151502 | A1 | 6/2013 | Yoon et al. |
| 2017/0103103 | A1 | 4/2017 | Nixon et al. |
| 2017/0147705 | A1 | 5/2017 | Kasperovics et al. |
| 2017/0185645 | A1 | 6/2017 | Agarwal et al. |
| 2018/0218044 | A1 * | 8/2018 | Wong ................. G06F 16/2282 |
| 2019/0034482 | A1 | 1/2019 | Werner et al. |
| 2019/0087461 | A1 * | 3/2019 | Hu ..................... G06F 16/221 |
| 2019/0188409 | A1 | 6/2019 | Henein |
| 2019/0325052 | A1 | 10/2019 | Bastawala et al. |
| 2020/0012745 | A1 | 1/2020 | Bain |
| 2020/0117745 | A1 | 4/2020 | Krishna Pg et al. |
| 2020/0201909 | A1 | 6/2020 | Das et al. |
| 2020/0301917 | A1 | 9/2020 | Niu et al. |
| 2021/0019312 | A1 | 1/2021 | Shaik et al. |
| 2021/0081389 | A1 * | 3/2021 | Liu ................... G06F 16/24552 |
| 2022/0067024 | A1 * | 3/2022 | Pethe ................. G06F 16/25 |

FOREIGN PATENT DOCUMENTS

| | | |
|---|---|---|
| CN | 108027818 B | 8/2019 |
| CN | 111414352 A | 7/2020 |
| CN | 111460049 A | 7/2020 |
| CN | 111797073 A | 10/2020 |
| CN | 112000902 B | 1/2021 |
| CN | 112347133 A | 2/2021 |
| EP | 1066571 A1 | 1/2001 |
| EP | 1337937 A2 | 8/2003 |
| EP | 1798902 A1 | 6/2007 |
| EP | 2860646 B1 | 4/2020 |
| EP | 3655847 A1 | 5/2020 |
| EP | 3743786 A1 | 12/2020 |
| KR | 100482311 B1 | 4/2005 |
| KR | 20060055108 A | 5/2006 |
| WO | 0219063 A2 | 3/2002 |
| WO | 0227426 A2 | 4/2002 |
| WO | 03021377 A2 | 3/2003 |
| WO | 2006096939 A1 | 9/2006 |
| WO | 2006128062 A2 | 11/2006 |
| WO | 2006130521 A1 | 12/2006 |
| WO | 2007133605 A2 | 11/2007 |
| WO | 2008055218 A2 | 5/2008 |
| WO | 2011130706 A2 | 10/2011 |
| WO | 2020113314 A1 | 6/2020 |
| WO | 2021103621 A1 | 6/2021 |

* cited by examiner

| Root Element | Accepted Values |
|---|---|
| env | Environments supported by SecureID |
| version | V1 |
| dbType | In-memory<br>or<br>relational<br>or<br>nosql |
| dbName | |
| operation | create/read/readDistinct/update/delete |
| query | [{<br>    "collection": "TABLE_NAME",<br>    "selectOrInsertAttributes": [{<br>       "function": "min/max/count/average/sum",<br>       "key": "COLUMN_NAME",<br>       "alias": "Alias Name"<br>    },<br>    {<br>       "key": "COLUMN_NAME"<br>    },<br>    {<br>       "key": "COLUMN_NAME"<br>    }],<br>    "conditions": [{<br>       "operator": "and/or/not",<br>       "key": "COLUMN_NAME",<br>       "value": "COLUMN_VALUE/now",<br>       "conditionType":<br>       "lt/gt/lteq/gteq/eq/noteq/between/like",<br>       "conditionalValue": "should be passed if between operator is used"<br>    },<br>    {<br>       "operator": "and/or/not",<br>       "key": "COLUMN_NAME",<br>       "value": "COLUMN_VALUE/now",<br>       "conditionType": "lt/gt/lteq/gteq/eq/noteq"<br>    }],<br>    "sort": {<br>       "key": "COLUMN_NAME",<br>       "criteria": "asc/desc"}}] |

FIG. 4

| Attribute | Possible Values |
|---|---|
| collection | <TABLE_NAME> |
| selectOrInsertAttributes | [{<br>"function": "min/max/count/average/sum",<br>"key": "COLUMN_NAME",<br>"alias": "Alias Name"<br>},<br>{<br>"key": "COLUMN_NAME"<br>},<br>{<br>"key": "COLUMN_NAME"<br>}] |
| conditions | [{<br>"operator": "and/or/not",<br>"key": "COLUMN_NAME",<br>"value": "COLUMN_VALUE/now",<br>"conditionType": "lt/gt/lteq/gteq/eq/noteq/between/like",<br>"conditionalValue": "should be passed if between operator is used "<br>},<br>{<br>"operator": "and/or/not",<br>"key": "COLUMN_NAME",<br>"value": "COLUMN_VALUE/now",<br>"conditionType": "lt/gt/lteq/gteq/eq/noteq"<br>}] |
| sort | {<br>"key": "COLUMN_NAME",<br>"criteria": "asc/desc"<br>} |

ID/EUI, which is an
INTERMEDIATE COMMUNICATION LAYER TO TRANSLATE A REQUEST BETWEEN A USER OF A DATABASE AND THE DATABASE

CROSS-REFERENCE TO RELATED APPLICATIONS

This application is a continuation of U.S. patent Application Ser. No. 17/382,229, filed on Jul. 21, 2021, entitled INTERMEDIATE COMMUNICATION LAYER TO TRANSLATE A REQUEST BETWEEN A USER OF A DATABASE AND THE DATABASE, which is hereby incorporated by reference in its entirety.

BACKGROUND

Database migration is the process of migrating data from one or more source databases to one or more target databases by using a database migration service. When a migration is finished, the dataset in the source databases resides fully, though possibly restructured, in the target databases. Clients that accessed the source databases are then switched over to the target databases, and the source databases are turned down. The switching of clients to the target databases can be a time- and resource-consuming process, requiring developers to rewrite code residing on the client to communicate with the new, target database.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to utilize an intermediate communication layer to translate a request between a user of a database and the database. The system can receive from the user the request associated with the database including a query to perform within the database and a type of the database. The query can be expressed in a language that is not native to the database, such as JSON, YAML, XML, etc. In other words, if the request expressed in the non-native language were sent to the database, the database would not be able to process the request and produce an output. The type associated with the database can include an in-memory database such as REDIS, a NoSQL database such as DYNAMO DB or MONGO DB, or a relational database such as MySQL.

Based on the type associated with the database, the system can create a corresponding command native to the database by translating the query. The system can connect to the database, execute the corresponding command native to the database, and receive an output of the corresponding command native to the database. Finally, the system can translate the output of the corresponding command native to the database into the language of the query, such as JSON, and provide the translated output to the user.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Figure 1:
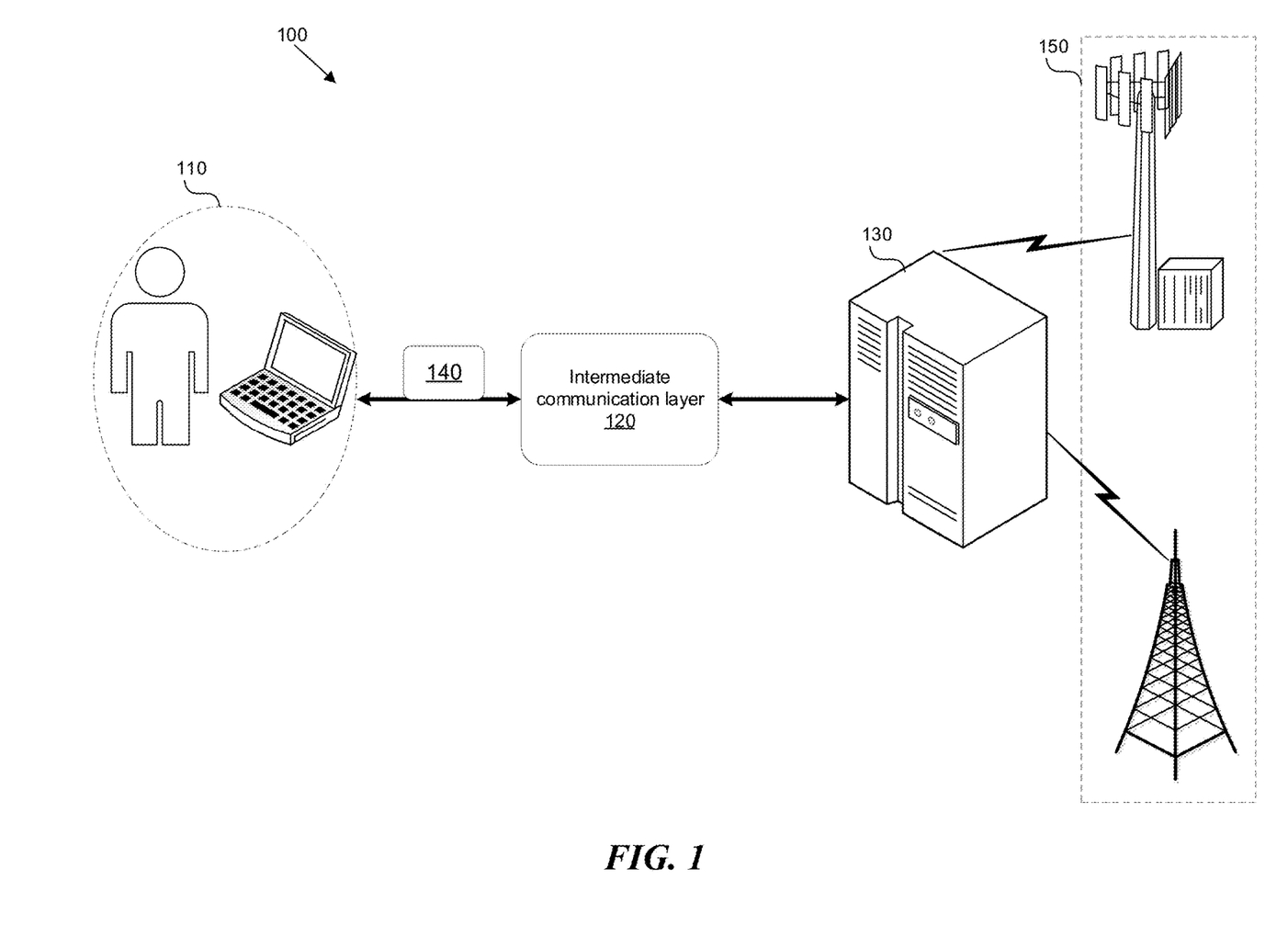
FIG. 1 shows an overview system including the intermediate communication layer.

Intermediate Communication Layer to Translate a Request Between a User of a Database and the Database FIG. 1 shows an overview system including the intermediate communication layer. The system 100 can include a requester 110, an intermediate communication layer 120, and one or more databases ("database") 130. A specific example of the system is TMobileID/EUI, which is an application that is using the intermediate communication layer 120 to migrate from MySQL(SQL) to MongoDB9NOSQL. TMobileID/EUI can migrate all Device Access Tokens from MySQL to MongoDB with minimal efforts. Another example use of the system 100 is merging one company's database, e.g. Sprint's database, charge records for billing cellular subscriber calls/data usage with another company's database, e.g. T-Mobile's database.

The requester 110 can be a user equipment (UE) associated with a user sending a request 140 to the database 130. The database 130 can store various information, such as information associated with a wireless telecommunication network ("telecommunication network") 150. The database 130 can be an in-memory database, such as REDIS; a relational or SQL (Structured Query Language) database, such as MySQL; or a NoSQL database, such as DYNAMO DB or MONGO DB, etc. Various databases 130 implement various database languages such as C, SQL, C#, Perl, PHP, Ruby, Erlang, etc.

The request 140 can be in a language that the database 130 cannot parse. For example, the request 140 can be in a high-level language not specific to database programming, such as JSON, YAML, Extensible Markup Language (XML), Python, C++, Java, JavaScript, etc. JSON is an open standard file format and data interchange format that uses human-readable text to store and transmit data objects consisting of attribute— value pairs and arrays. It is a very common data format, with a diverse range of applications, one example being web applications that communicate with a server. YAML is a human-readable data-serialization language. It is commonly used for configuration files and in applications where data is being stored or transmitted. XML is a markup language that defines a set of rules for encoding documents in a format that is both human-readable and machine-readable.

In another example, the request 140 can be a natural language request, such as English. By enabling the request to be in a language that is not specific to database programming, the system 100 expands the access to the database 130 to requesters 110 that are not especially programmed and configured to talk to the particular database 130. Further, if the database 130 is changed from a REDIS database to a MySQL database, the requester 110 does not have to update the request 140, because the intermediate communication layer 120 can be configured to translate the request 140 to the appropriate language that the database 130 can parse.

The intermediate communication layer 120 is a library that provides abstraction between the application code running on the requester 110 device and the database language, e.g., query language, running on the database 130, where the actual code is used to perform CRUD (CREATE, READ, UPDATE, DELETE) operations as well as more complex operations including JOIN on the database 130. The intermediate communication layer 120 can use JSON as a means of communication between the application code running on the requester 110 device and actual code running on the database 130. Application code running on the requester 110 device can construct a JSON request 140 and ask the intermediate communication layer 120 to perform any CRUD operation.

The intermediate communication layer 120 can translate the JSON request 140 created by application code running on the requester 110 device to an underlying query language running on the database 130 to perform any CRUD operations. The intermediate communication layer 120 can also manage the connectivity with the underlying database 130 and can provide an abstraction of the database 130 being used. As explained above, the intermediate communication layer 120 enables the requester 110 to migrate to any database with minimal or no changes to the application code running on the requester 110 device.

Figure 2:
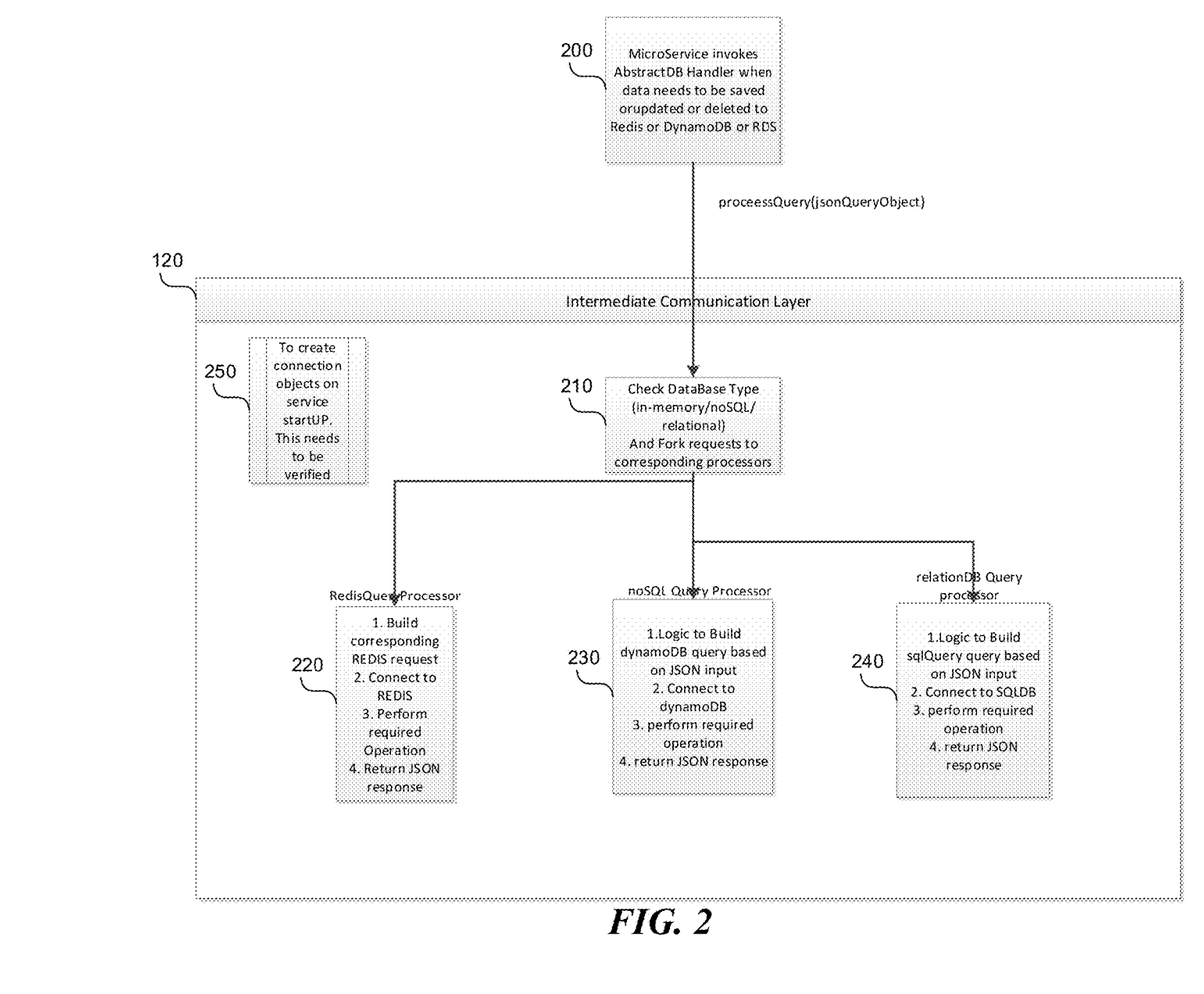
FIG. 2 shows the operation of the intermediate communication layer.

FIG. 2 shows the operation of the intermediate communication layer 120. The micro service 200 can invoke the intermediate communication layer 120, upon receiving a request 140 in FIG. 1 for an operation on the database 130 in FIG. 1. The intermediate communication layer 120, in block 250, can check all the databases to which it has access. Further, in block 250, when the intermediate communication layer 120 is initiated, the intermediate communication layer can create connections to all the databases to which it has access. Every application server has its own way of creating connections to database and maintaining a Pool of these connections, which is called connection pooling. The intermediate communication layer 120 verifies that connection pooling is allowed in nodeJS.

Creation of the connections to all the databases can involve an overhead of about 60-100 milliseconds. By creating the connections to the databases at start-up, the intermediate communication layer 120 avoids the delay when receiving the request 140 in FIG. 1. Consequently, the response to the requester 110 device in FIG. 1 is faster.

The intermediate communication layer 120, in block 210, can check a type of the database 130 to determine whether the database is an in-memory database, a NoSQL database, or a relational (e.g., SQL) database. To check the database type, the intermediate communication layer 120 can check the database type specified in the request 140. Based on the database type, the intermediate communication layer 120 can fork requests to corresponding processors. Each database has an associated processor to convert JSON/xml/yaml to appropriate underlying database query. In other words, the intermediate communication layer 120 can translate the request 140 into the corresponding command native to the database, e.g., the corresponding query language.

If the intermediate communication layer 120 determines that the database is a REDIS database, in block 220, the intermediate communication layer 120 builds a corresponding REDIS request corresponding to the request 140. The intermediate communication layer 120 connects to the REDIS database, performs a required operation specified in the request 140, translates the output of the operation into a language of the request 140, and returns the translated output to the requester 110.

Similarly, if the intermediate communication layer 120 determines that the database is a NoSQL database, in block 230, the intermediate communication layer 120 builds a DYNAMO DB or a MONGO DB request corresponding to the request 140. The intermediate communication layer 120 connects to the DYNAMO DB or MONGO DB database, performs a required operation specified in the request 140, translates the output of the operation into a language of the request 140, and returns the translated output to the requester 110.

Finally, if the intermediate communication layer 120 determines that the database is a relational database, in block 240, the intermediate communication layer 120 builds an SQL request corresponding to the request 140. The intermediate communication layer 120 connects to the SQL database, performs a required operation specified in the request 140, translates the output of the operation into a language of the request 140, and returns the translated output to the requester 110.

Figure 3A:
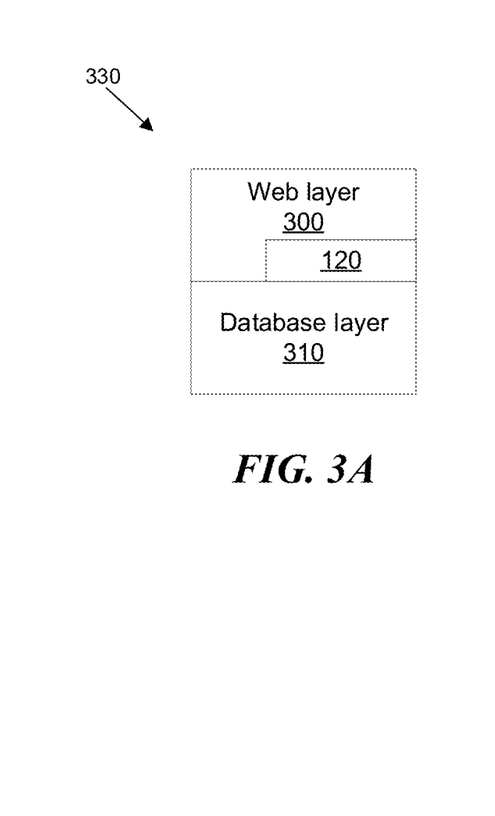
FIGS. 3A-3B show various ways in which the system can invoke the intermediate communication layer.
Figure 3B:
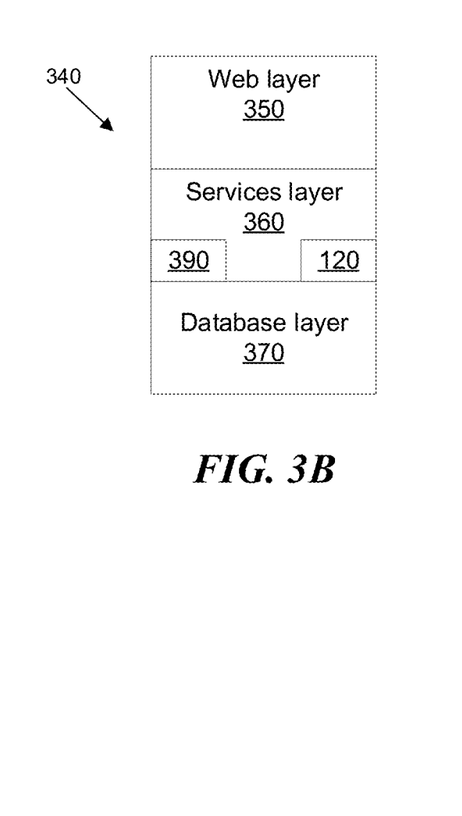

FIGS. 3A-3B show various ways in which the system can invoke the intermediate communication layer 120 in FIG. 1. In FIG. 3A, the system 330 includes 2 layers: the web layer 300 and the database layer 310. The web layer 300 can provide a user interface to the requester 110 in FIG. 1, such as a web user interface, or a voice user interface. The intermediate communication layer 120 can exist as part of the web layer, and can be invoked upon receiving an input from the user. Consequently, the intermediate communication layer 120 can pass requests translated to the database language to the database layer 310.

In FIG. 3B, the system 340 includes 3 layers: the web layer 350, the services layer 360, and the database layer 370. The web layer 350 can provide the user interface to the requester 110, as explained above. The services layer 360 can contain the intermediate communication layer 120 and the micro services 390. Upon receiving user input from the web layer 350, the system 340 invokes the micro services 390. In turn, the micro services 390 invokes the intermediate communication layer 120.

Figure 4:
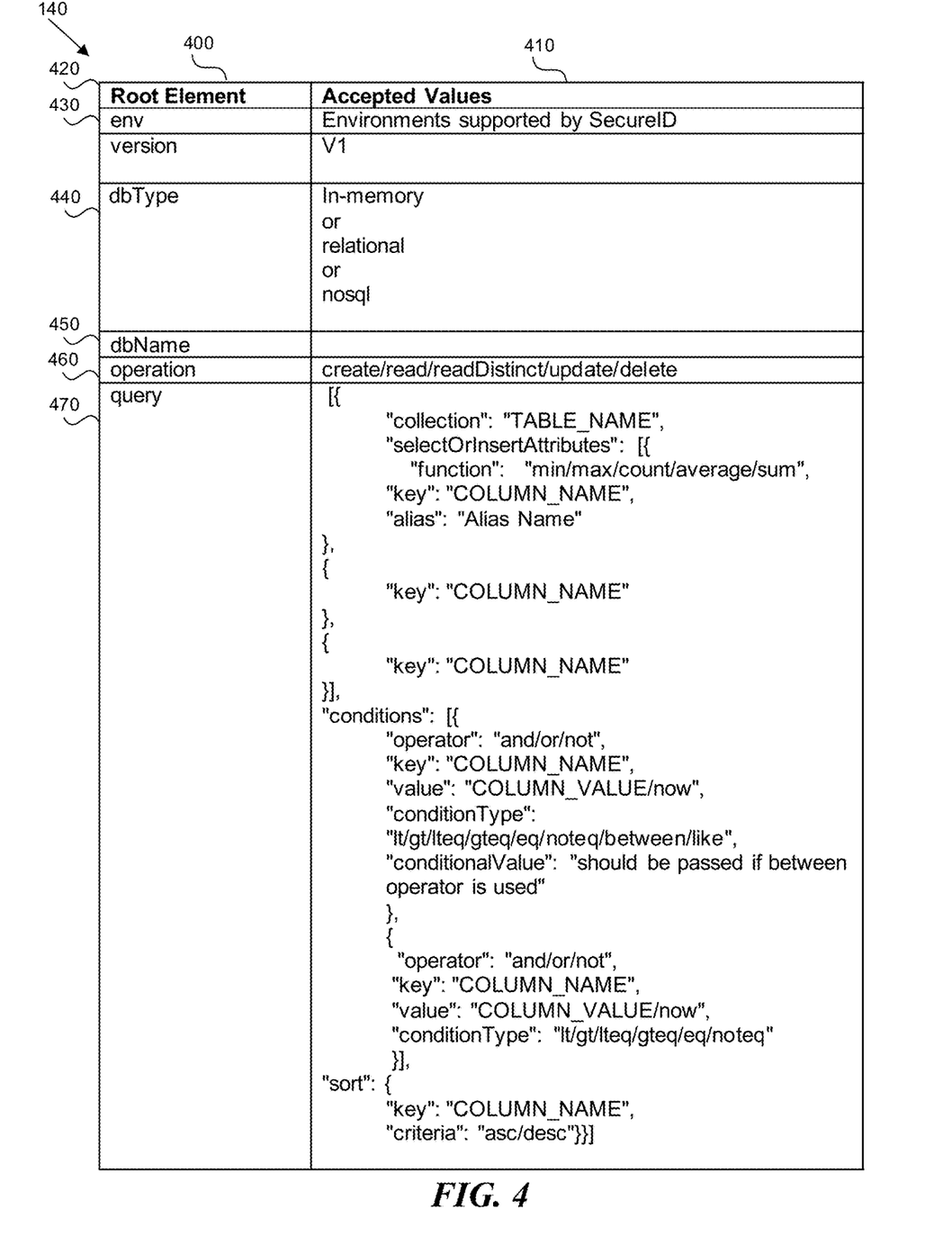
FIG. 4 shows elements of the request.

FIG. 4 shows elements of the request 140. Column 400 shows the root element contained in the request 140. Column 410 shows accepted values of the corresponding root element. The root element 420, "env," specifies an environment where the query needs to be executed. The environment can be a test environment or a production environment. A production environment means that the system has been tested and is deployed to users. A test environment can be divided into multiple levels: development environment, quality assurance environment, and preproduction environment. The lowest level is development environment, where the system is being tested by the developers. A higher testing environment is quality assurance. Quality assurance means that the system has passed the development environment and is tested by quality assurance engineers. The highest testing environment is the preproduction environment. Preproduction means that the system has passed the development environment and the quality assurance environment and is being tested prior to deployment. Once the system passes the preproduction environment tests, the system can be deployed to users in the production environment.

The root element 430, "version," specifies the version of the intermediate communication layer 120, such as the version of the JSON query parser.

The root element 440, "dbType," specifies the type of the database, such as in-memory, relational, or NoSQL. For example, if the database 130 in FIG. 1 is changed from REDIS to MySQL, the root element 440 needs to change from REDIS to MySQL. The root element 440 is not part of the application code running on the requester 110 device in FIG. 1. Instead, the root element 440 is part of a configuration file associated with the requester 110 device. Therefore, when the database 130 changes, the application code associated with the requester 110 device does not change, and only the configuration file changes. Changing the configuration file is simpler and less error-prone than changing the application code and makes application code development easier and more stable.

The root element 450, "dbName," specifies the ID, such as the name, of the database 130 in FIG. 1. The root element 460, "operation," specifies the type of operation to perform such as create, read, read distinct, update, delete, join. The root element 470, "query," is the core of the request 140. The query specifies the ID of the portion of the database to access, such as column name and logic for executing the query. Below is an example of the request 140 specified in JSON:

```
{
    "env": "environment where query needs to be executed",
    "version": "v1",
    "dbType": "in-memory/relational/nosql",
    "dbName": "Database Name",
    "operation": "create/read/readDistinct/update/delete"
    "query": [{
        "collection": "TABLE_NAME"
        "selectOrInsertAttributes": [{
            "function": "min/max/count/average/sum",
            "key": "COLUMN_NAME",
            "alias": "Alias Name"
        },
        {
            "key": "COLUMN_NAME"
        },
        {
            "key": "COLUMN_NAME"
        }
        ],
        "conditions": [{
            "operator": "and/or/not",
            "key": "COLUMN_NAME",
            "value": "COLUMN_VALUE/now",
            "conditionType": "lt/gt/lteq/gteq/eq/noteq/between/like",
            "conditionalValue": "should be passed if between
    operator is used"
        },
        {
            "operator": "and/or/not",
            "key": "COLUMN_NAME",
            "value": "COLUMN_VALUE/now",
            "conditionType": "lt/gt/lteq/gteq/eq/noteq"
        }
        ],
        "sort": {
            "key": "COLUMN_NAME",
```

-continued

```
            "criteria": "asc/desc"
        }
    }]
}
```

Figure 5:
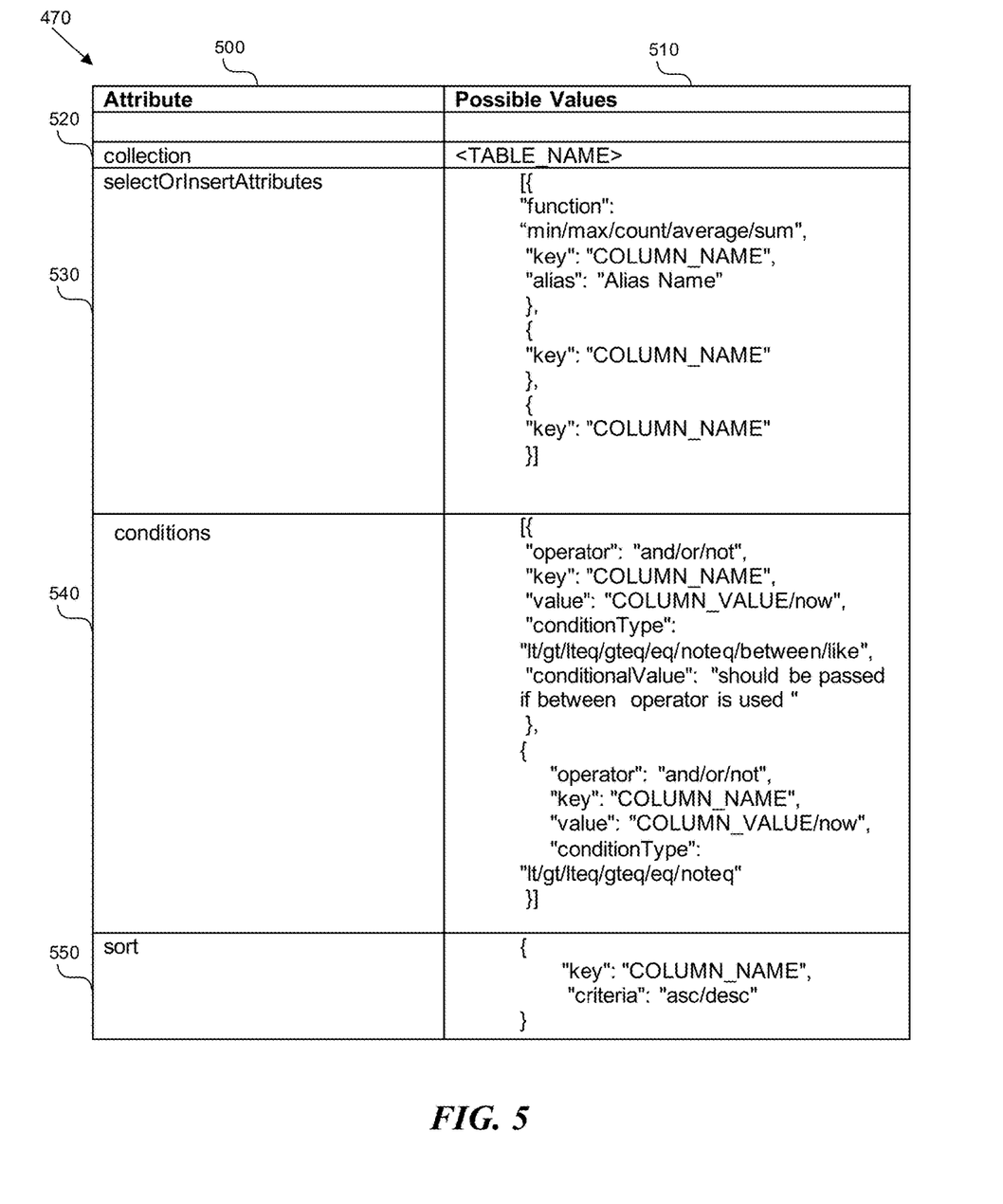
FIG. 5 shows contents of a query.

FIG. 5 shows contents of a query 470. Column 500 shows the attributes contained in the query 470 in FIG. 4. Column 510 shows the possible values of the corresponding attributes in column 500. Attribute 520, "collection," is an ID of a portion of the database, e.g., a table stored in the database, on which to execute the request. Attribute 530, "selectOrInsertAttributes," includes a column ID associated with the table, and a value associated with the column ID. The attribute 530 can include an array of column names that can be selected from a collection 520, such as a table name, and values that can be inserted in the collection, such as the table name.

Attribute 540, "conditions," is an indication of a condition that an entry needs to satisfy to comply with the query 470. For example, attribute 540 is used to specify a condition while fetching the data from a single table or by joining with multiple tables. If, and only if, the given condition is satisfied, the system returns a specific value from the table.

Attribute 550, "sort," specifies how to order the output of the query 470. For example, if the output of the query 470 includes multiple rows, the system sorts the rows according to the order specified by attribute 550. For example, the system can sort the rows by the values of one or more columns contained in the rows.

Figure 6:
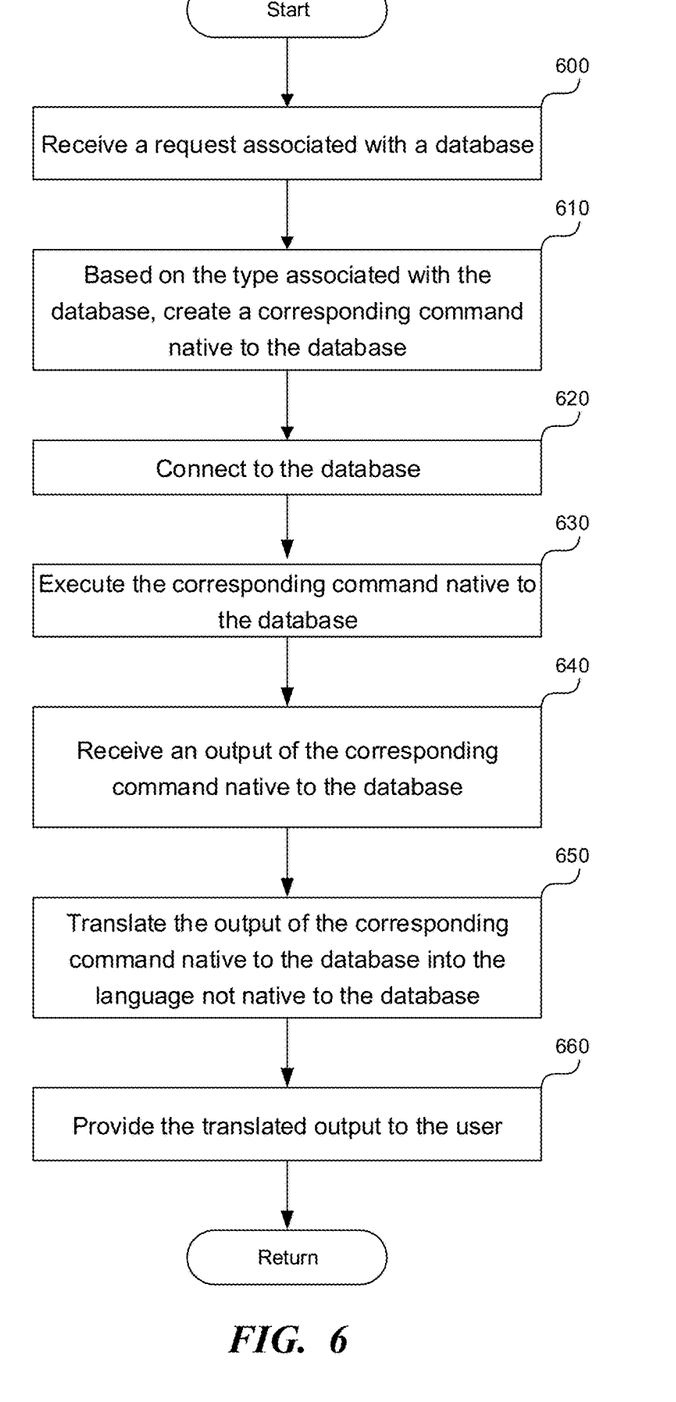
FIG. 6 is a flowchart of a method to utilize an intermediate communication layer to translate a request between a user of a database and the database.

FIG. 6 is a flowchart of a method to utilize an intermediate communication layer to translate a request between a user of a database and the database. In step 600, a hardware or software processor executing instructions described in this application can receive a request associated with a database including a query associated with the database and a type associated with the database. The request can be expressed in a language that is not native to the database, such as JSON, YAML, XML, etc., which the database cannot parse. The query can include a command in the language that is not native to the database. The type associated with the database can include an in-memory database such as REDIS, a NoSQL database such as DYNAMO DB or MONGO DB, or a relational database such as MySQL.

In step 610, based on the type associated with the database, the processor can create a corresponding command native to the database by translating the query to the corresponding command native to the database. For example, if the database is an in-memory database, the processor can translate the query to the REDIS command. If the database is a NoSQL database, the processor can translate the query into non-SQL commands that can be parsed by the NoSQL database. If the database is a relational database, the processor can translate the query into SQL.

In step 620, the processor can connect to the database. The processor can connect to the database upon receiving the request from the user. Alternatively, the processor can connect to the database prior to receiving the request from the user. For example, the processor can initiate the intermediate communication layer. Upon initiating the intermediate communication layer and prior to receiving the request associated with the database, the processor can determine one or more databases associated with the intermediate communication layer. Upon initiating the intermediate communication layer and prior to receiving the request associated with the database, the processor can create a connection between the intermediate communication layer and the one or more databases associated with the intermediate communication layer. As a result, the requester does not have to wait almost a second for the initiation of the connection with the database.

In step 630, the processor can execute the corresponding command native to the database. In step 640, the processor can receive an output of the corresponding command native to the database. In step 650, the processor can translate the output of the corresponding command native to the database into the language not native to the database. In step 660, the processor can provide the translated output to the user.

The processor can receive the query including: an ID of a table stored in the database on which to execute the request, a column ID associated with the table, a value associated with the column ID, and an indication of a condition. To execute the corresponding command, the processor can select one or more entries in the column ID associated with the table, where the one or more entries satisfy the condition.

The processor can receive from the user the request including: an indication of an environment where the query is to be executed, an indication of a version of the intermediate communication layer, identification (ID) of the database, and an operation to execute on the database, where the operation includes create, read, update, or delete. The processor can execute the request.

The processor can receive the query including: an ID of a table stored in the database on which to execute the request, a column ID associated with the table, a value associated with the column ID, and an indication of an order. The processor can select one or more entries in the column ID associated with the table, where the one or more entries satisfy the condition. The processor can arrange the one or more entries according to the indication of the order.

Computer System

Figure 7:
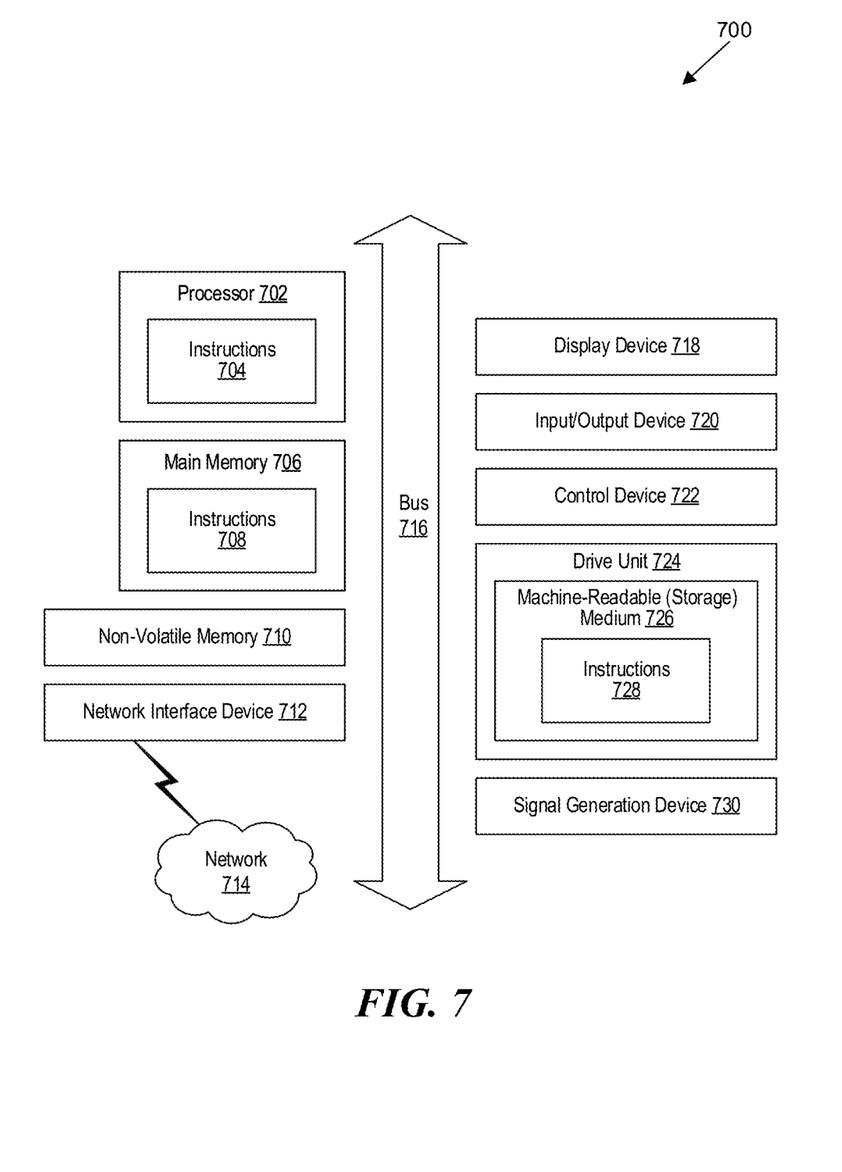
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the Figures and any other components described in this specification can be implemented.

The processor 702 of the computer system 700 can implement the instructions described in this application, for example the instructions described in FIGS. 1-6. The processor 702 can be associated with the requester 110 in FIG. 1, the intermediate communication layer 120, the database 130 in FIG. 1, and/or the telecommunication network 150 in FIG. 1. The processor 702 can implement the web layer 300 in FIG. 3A, 350 in FIG. 3B, the database layer 310 in FIG. 3A, 370 in FIG. 3B, and/or the services layer 360 in FIG. 3B. The main memory 706, the non-volatile memory 710, and/or the drive unit 724 can store the request 140 in FIG. 1, and the instructions described in this application. The network 714 can facilitate communication between the requester 110, the intermediate communication layer 120, the database, and/or the telecommunication network 150. Further, the network 714 can facilitate communication between the web layer 300, 350, the database layer 310, 370, and the services layer 360.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementations, the computer system 700 can be an embedded computer system, a system-on-chip (SOC), a single-board computer system (SBC), or a distributed system such as a mesh of computer systems or include one or more cloud components in one or more networks. Where appropriate, one or more computer systems 700 can perform operations in real time, in near real time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

I claim:

1. A non-transitory computer-readable storage medium storing instructions, which, when executed by at least one data processor of a system, cause the system to:
   send a request associated with a database including a query associated with the database and a type associated with the database,
      wherein the type associated with the database comprises an in-memory database, a NoSQL database, or a relational database,
      wherein the request is expressed in a language that is not native to the database, and
      wherein the query includes a command in the language that is not native to the database;
   cause the request to include an indication of an environment where the query is to be executed,
      wherein the environment includes an indication of whether an intermediate communication layer is deployed or whether the intermediate communication layer is being tested;
   based on the type associated with the database, cause a creation of a corresponding command native to the database by translating the query to the corresponding command native to the database;

cause a connection to the database;
cause an execution of the corresponding command native to the database to obtain an output of the corresponding command native to the database;
cause a translation of the output of the corresponding command native to the database into the language not native to the database; and
receive the translated output.

2. The non-transitory computer-readable storage medium of claim 1, wherein the instructions to cause the connection to the database comprise:
cause an initiation of the intermediate communication layer;
upon initiating the intermediate communication layer and prior to receiving the request associated with the database, cause an identification of one or more databases associated with the intermediate communication layer; and
upon initiating the intermediate communication layer and prior to receiving the request associated with the database, cause a creation of a connection between the intermediate communication layer and the one or more databases associated with the intermediate communication layer.

3. The non-transitory computer-readable storage medium of claim 1, further comprising the instructions to:
send the query including:
an ID of a table stored in the database on which to execute the request,
a column ID associated with the table,
a value associated with the column ID,
an indication of a condition; and
cause a selection of one or more entries in the column ID associated with the table,
wherein the one or more entries satisfy the condition.

4. The non-transitory computer-readable storage medium of claim 1, further comprising the instructions to:
send the request including:
an indication of a version of the intermediate communication layer,
identification (ID) of the database, and
an operation to execute on the database,
wherein the operation includes create, read, update, or delete; and
cause an execution of the request.

5. The non-transitory computer-readable storage medium of claim 1, further comprising the instructions to:
send the query including:
an ID of a table stored in the database on which to execute the request,
a column ID associated with the table,
a value associated with the column ID,
an indication of a condition, and
an indication of an order;
cause a selection of one or more entries in the column ID associated with the table,
wherein the one or more entries satisfy the condition; and
cause an arrangement of the one or more entries according to the indication of the order.

6. The non-transitory computer-readable storage medium of claim 1, wherein the type associated with the database comprising REDIS, MySQL, DYNAMO DB, and MONGO DB.

7. The non-transitory computer-readable storage medium of claim 1, wherein the language that is not native to the database comprises JSON, XML, or YAML.

8. A method comprising:
sending a request associated with a database including a query associated with the database and a type associated with the database,
wherein the type associated with the database comprises an in-memory database, a NoSQL database, or a relational database,
wherein the request is expressed in a language that is not native to the database;
causing the request to include an indication of an environment where the query is to be executed,
wherein the environment includes an indication of whether an intermediate communication layer is deployed or whether the intermediate communication layer is being tested;
based on the type associated with the database, causing a creation of a corresponding command native to the database by translating the query to the corresponding command native to the database;
causing a connection to the database;
causing an execution of the corresponding command native to the database to obtain an output of the corresponding command native to the database;
causing a translation of the output of the corresponding command native to the database into the language not native to the database; and
receiving the translated output.

9. The method of claim 8, wherein causing the connection to the database comprises:
causing an initiation of the intermediate communication layer;
upon initiating the intermediate communication layer and prior to receiving the request associated with the database, causing an identification of one or more databases associated with the intermediate communication layer; and
upon initiating the intermediate communication layer and prior to receiving the request associated with the database, causing a creation of a connection between the intermediate communication layer and the one or more databases associated with the intermediate communication layer.

10. The method of claim 8, comprising:
sending the query including:
an ID of a table stored in the database on which to execute the request,
a column ID associated with the table,
a value associated with the column ID,
an indication of a condition; and
causing a selection of one or more entries in the column ID associated with the table,
wherein the one or more entries satisfy the condition.

11. The method of claim 8, comprising:
sending the request including:
an indication of a version of the intermediate communication layer,
identification (ID) of the database, and
an operation to execute on the database,
wherein the operation includes create, read, update, or delete; and
causing an execution of the request.

12. The method of claim 8:
sending the query including:
an ID of a table stored in the database on which to execute the request,
a column ID associated with the table,
a value associated with the column ID, an indication of a condition, and
an indication of an order;
causing a selection of one or more entries in the column ID associated with the table,
wherein the one or more entries satisfy the condition; and
causing an arrangement of the one or more entries according to the indication of the order.

13. The method of claim 8, the type associated with the database comprising REDIS, MySQL, DYNAMO DB, and MONGO DB.

14. A system comprising:
at least one hardware processor; and
at least one non-transitory memory storing instructions, which, when executed by the at least one hardware processor, cause the system to:
send a request associated with a database including a query associated with the database and a type associated with the database,
wherein the type associated with the database comprises an in-memory database, a NoSQL database, or a relational database,
wherein the request is expressed in a language that is not native to the database;
cause the request to include an indication of an environment where the query is to be executed,
wherein the environment includes an indication of whether an intermediate communication layer is deployed or whether the intermediate communication layer is being tested;
based on the type associated with the database, cause a creation of a corresponding command native to the database by translating the query to the corresponding command native to the database;
cause a connection to the database;
cause an execution of the corresponding command native to the database to obtain an output of the corresponding command native to the database;
cause a translation of the output of the corresponding command native to the database into the language not native to the database; and
receive the translated output.

15. The system of claim 14, wherein the instructions to cause the connection to the database comprise:
cause an initiation of the intermediate communication layer;
upon initiating the intermediate communication layer and prior to receiving the request associated with the database, cause an identification of one or more databases associated with the intermediate communication layer; and
upon initiating the intermediate communication layer and prior to receiving the request associated with the database, cause a creation of a connection between the intermediate communication layer and the one or more databases associated with the intermediate communication layer.

16. The system of claim 14, further comprising instructions to:
send the query including:
an ID of a table stored in the database on which to execute the request,
a column ID associated with the table,
a value associated with the column ID,
an indication of a condition; and
cause a selection of one or more entries in the column ID associated with the table,
wherein the one or more entries satisfy the condition.

17. The system of claim 14, further comprising instructions to:
send the request including:
an indication of a version of the intermediate communication layer,
identification (ID) of the database, and
an operation to execute on the database,
wherein the operation includes create, read, update, or delete; and
cause an execution of the request.

18. The system of claim 14, further comprising instructions to:
send the query including:
an ID of a table stored in the database on which to execute the request,
a column ID associated with the table,
a value associated with the column ID,
an indication of a condition, and
an indication of an order;
cause a selection of one or more entries in the column ID associated with the table,
wherein the one or more entries satisfy the condition; and
cause an arrangement of the one or more entries according to the indication of the order.

19. The system of claim 14, wherein the type associated with the database comprising REDIS, MySQL, DYNAMO DB, and MONGO DB.

20. The system of claim 14, wherein the language that is not native to the database comprises JSON, XML, or YAML.

* * * * *